May 21, 1929.  R. C. LEWIS  1,713,969
MACHINE FOR TREATING RUBBER AND LIKE MATERIAL
Filed March 10, 1925    5 Sheets-Sheet 1
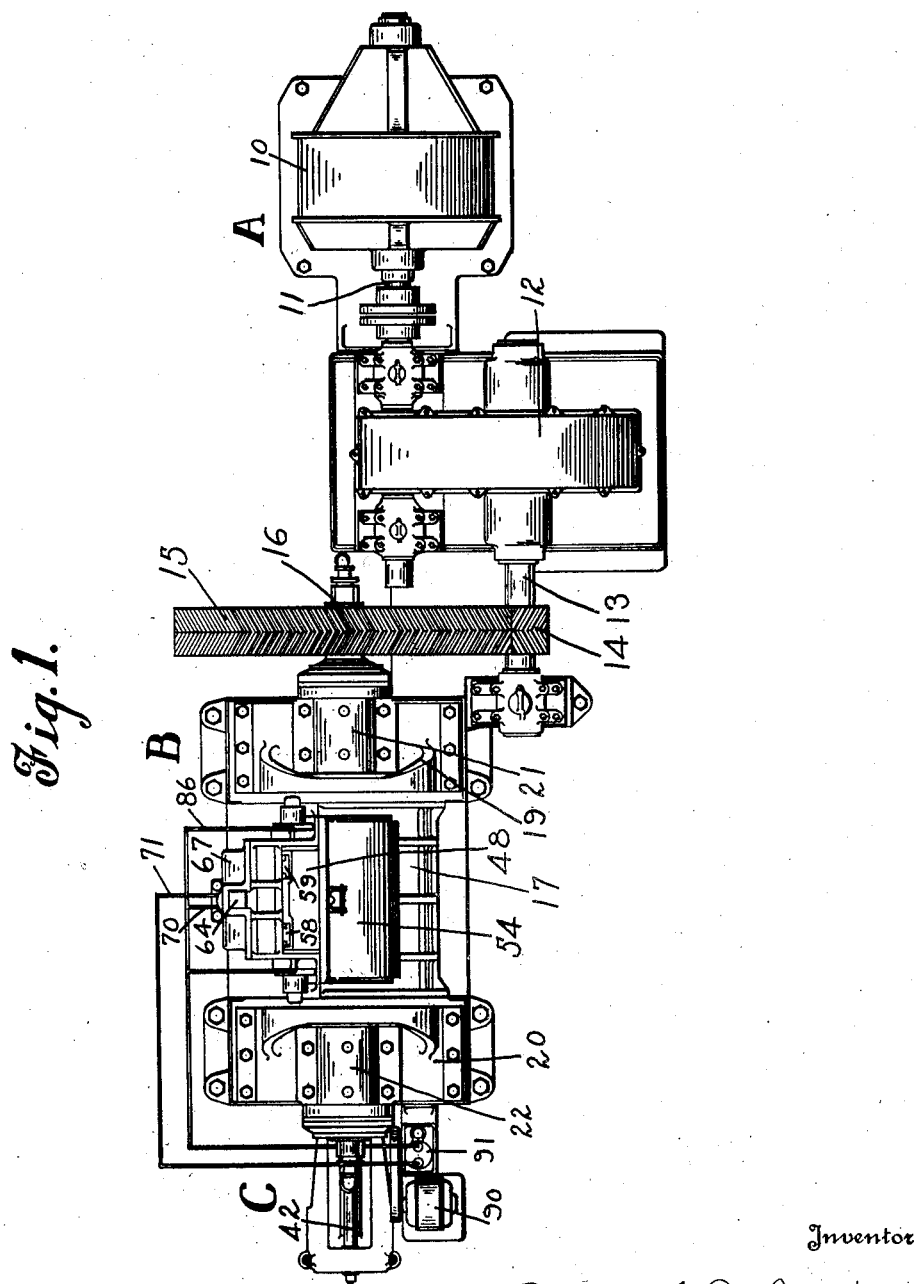

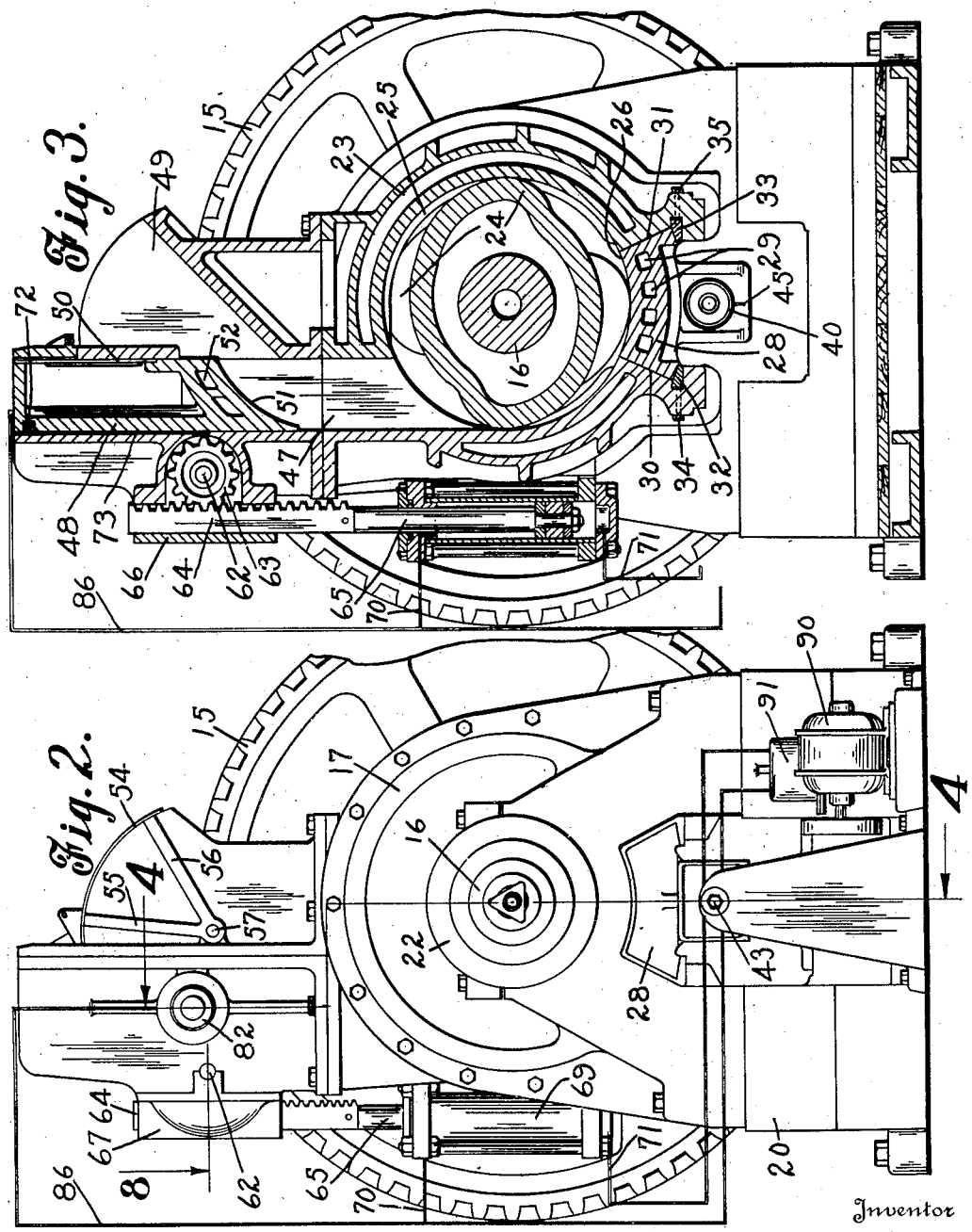

May 21, 1929.    R. C. LEWIS    1,713,969
MACHINE FOR TREATING RUBBER AND LIKE MATERIAL
Filed March 10, 1925    5 Sheets-Sheet 3

Inventor
Richard C. Lewis
By Henry E. [Attorney signature]
Attorney

May 21, 1929.    R. C. LEWIS    1,713,969
MACHINE FOR TREATING RUBBER AND LIKE MATERIAL
Filed March 10, 1925    5 Sheets-Sheet 4

May 21, 1929.   R. C. LEWIS   1,713,969
MACHINE FOR TREATING RUBBER AND LIKE MATERIAL
Filed March 10, 1925   5 Sheets-Sheet 5

Inventor
Richard C. Lewis
By Henry E. Rockwell
Attorney

Patented May 21, 1929.

1,713,969

UNITED STATES PATENT OFFICE.

RICHARD C. LEWIS, OF ANSONIA, CONNECTICUT, ASSIGNOR, BY MESNE ASSIGNMENTS, TO FARREL-BIRMINGHAM COMPANY, INCORPORATED, OF ANSONIA, CONNECTICUT, A CORPORATION OF CONNECTICUT.

MACHINE FOR TREATING RUBBER AND LIKE MATERIAL.

Application filed March 10, 1925. Serial No. 14,450.

This invention relates to machines for treating rubber, and similar material, and more especially to rubber mixing or masticating devices, comprising a mixing chamber within which the batch of material to be treated is introduced and a rotor or rotors within the chamber to act upon the material so as to mix and knead it as required for the purpose to which the material is to be used.

Such machines are usually relatively large and heavy, and the chamber is usually provided with separate charging and discharging devices which comprise openings in the chamber and some sort of closure members by which the charging and discharging of the material through these openings may be controlled. As these closure members are relatively heavy, and must in some instances be held in closed position with considerable pressure, power operated means have in some instances been used for their operation; that is, these closure members are moved from open to closed position and vice versa by power operated means rather than manually. Where such power operated means has been actuated by fluid pressure, the installation of a machine of this character has required that the plant in which the machine has been installed be equipped with compressed air or fluid pressure of some type in order to operate the machine. As not all plants are equipped with such a source of power, I contemplate the provision of a machine equipped with a source of fluid pressure as a unitary part thereof, the source of pressure being suitably connected to the various devices intended to be operated thereby.

I further contemplate the provision in a unitary installation of a rubber treating machine together with a source of fluid pressure for operating the various movable parts of the device, and also a prime source of power from which the rotor or rotors themselves may be driven, so that the device may be installed as a complete unit, if desired, without requiring the use of any power from the plant or factory within which the device is installed other than electric current.

One object of my invention, therefore, is the provision of a machine for treating rubber or similar materials provided with movable closures for the various charging and discharging openings, and having a built-in fluid pressure operated system for operating such devices.

Another object of my invention is the provision of a machine for treating rubber or similar materials which shall comprise a complete unit having incorporated therein a power source or sources for operating the various movable parts of the machine.

A still further object of the invention is the provision of improved means for operating the charging and discharging devices of the mixing chamber.

Still another object of the invention is the provision of a rubber mixing machine having a charging flue for the mixing chamber, a plunger operating within this flue, and improved means for operating the plunger and locking it in position to close the charging opening.

A still further object of the invention is the provision of improved means for operating and controlling the charging plunger for the mixing chamber such that it may be operated with a minimum effort on the part of the operator, and automatically operated locking means for securing the plunger in a fixed position during the operation of the machine.

To these and other ends the invention consists of the novel features and combination of parts to be hereinafter described and claimed.

In the accompanying drawings:

Fig. 1 is a top plan view of the complete installation of a rubber treating machine embodying my invention;

Fig. 2 is an end elevational view of the same;

Fig. 3 is a transverse sectional view through the mixing chamber on line 3—3 of Fig. 4;

Figure 4:
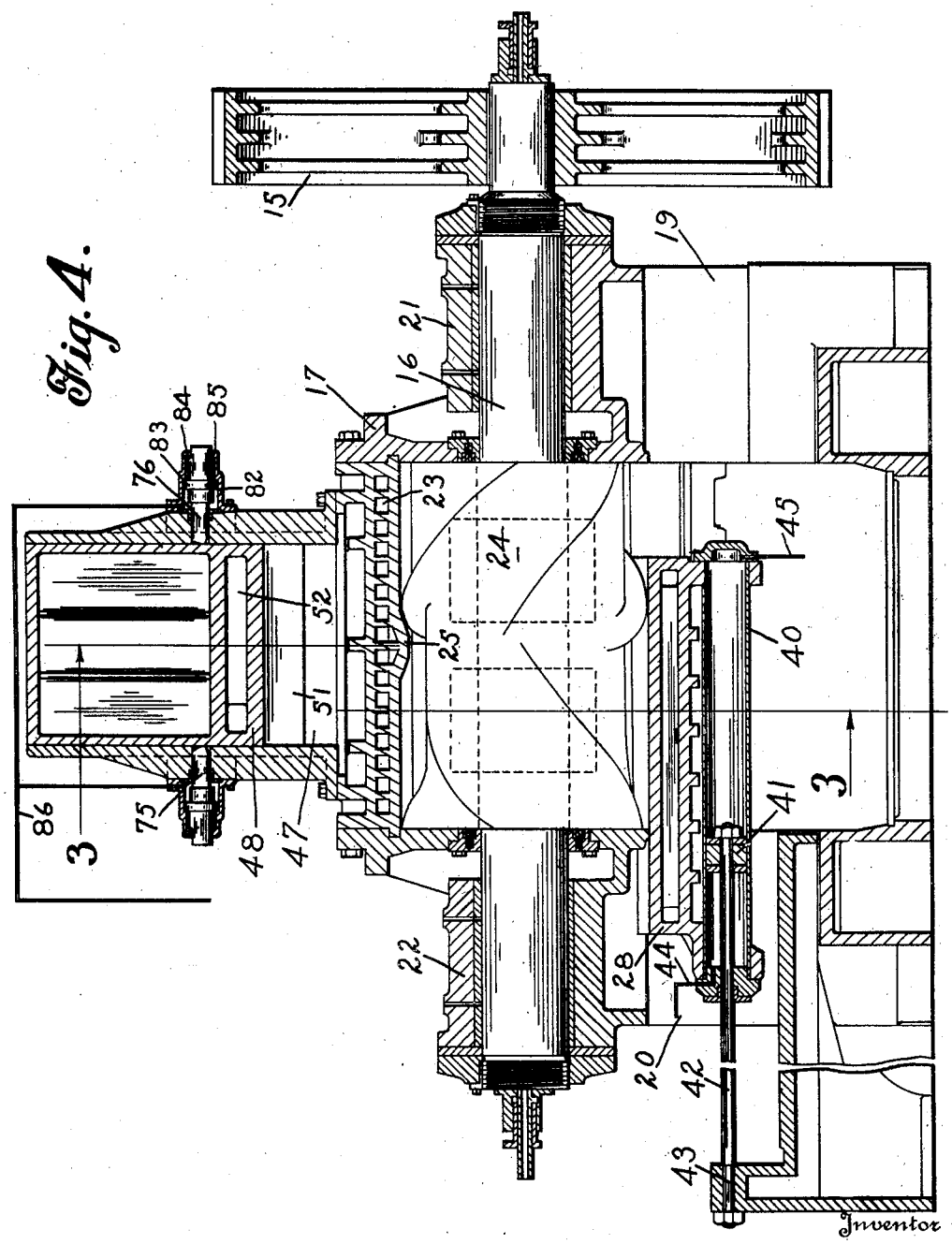
Fig. 4 is a longitudinal section through the mixing chamber on line 4—4 of Fig. 2.

As illustrated in Fig. 1 of the drawings, the installation which I have selected to show and describe as a preferred embodiment of my invention, comprises a prime source of power A, a rubber treating machine B, and a fluid pressure operating system C, all of which are built into a unitary machine and suitably connected with each other so that the installation is a unit complete in itself and may be operated without the employment of outside power other than electric current.

The prime source of power A consists of a motor 10, the shaft 11 of which is connected through suitable reducing gearing in the housing 12 to a shaft 13 upon which is mounted a pinion 14. The pinion 14 is in mesh with a gear 15 secured to the main rotor shaft 16. In some instances the above described features may be omitted, and the shaft 16 may be driven from any suitable source of power within the plant in which the rubber treating machine is installed, provided such power is available.

The rubber treating machine B comprises a chamber 17 suitably supported upon end standards 19 and 20, the standards at their upper ends being provided with bearings 21 and 22 for the rotor shaft 16. The walls of the chamber are preferably surrounded, at least partially, by water jackets 23 so that the chamber may be maintained at the proper temperature by the passage of a fluid therethrough.

Within the chamber the rotor is provided with suitably formed blades 24 designed to mash and smear the material against the chamber walls and to work it from one end of the chamber to the other past the intermediate extrusion rib 25 which projects inwardly from the chamber wall at the central portion thereof.

The discharge of the chamber is effected through an opening 26 at the lower part thereof, the opening being controlled by a sliding door or closure member 28 within which are formed suitable channels 29 for the passage of a cooling fluid. The upper surface of this door is substantially cylindrical in shape to conform to the shape of the interior of the chamber, and the sides 30 and 31 thereof are formed to extend substantially radially from the inner surface of the chamber so that a tight fit may be effected between the sides of this member and the discharge opening. Below the closure member are suitable wedge shaped bearing blocks 32 and 33 which may be adjusted by means of screws 34 and 35 to take up any wear in the door and insure a tight fit.

As shown in Fig. 4, a cylinder 40 is secured at the lower side of the discharge closure member, the cylinder receiving the piston 41 of the piston rod 42 secured at one end, as shown at 43, to the frame or base of the machine. Fluid under pressure may be introduced into the ends of the cylinder through the pipes 44 and 45 to move the cylinder in opposite directions upon the piston and thereby the closure member 28 is moved to open and closed position. The pipes 44 and 45 lead to a source of fluid pressure which will be described hereinafter.

Figure 5:
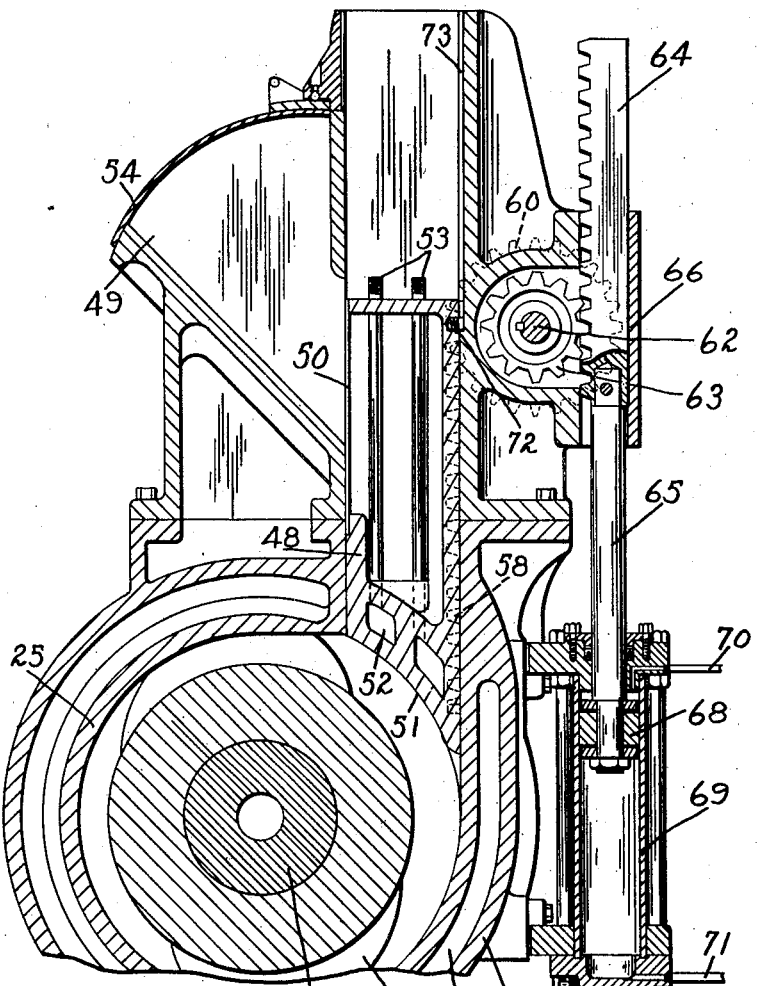
Fig. 5 is an enlarged transverse section through the mixing chamber.

At the upper part of the chamber is provided a charging stack or flue 47. As shown in the drawings, this stack is located adjacent the rear side of the machine, although it may be located directly above the center of the rotor if desired. Within this stack a charging plunger 48 is reciprocably mounted and designed to be moved from the closed position shown in Fig. 5, which it assumes during the operation of the machine, to the open position shown in Fig. 3, wherein the chamber may be charged through the hopper 49. The plunger may be formed as a solid piece but, preferably, it is hollow, as shown in Figs. 3 and 5, the front face being closed by a plate 50 which stands opposite the charging hopper when the plunger is in its lowered position. The lower surface of the plunger is of concave shape, as shown at 51, so that when in the position shown in Fig. 5 it effectually closes the charging opening while preserving the continuity of the inner cylindrical surface of the chamber. Suitable water passages 52 are provided for the circulation of a cooling fluid which may be supplied through the pipes 53. A cover 54 is provided for the hopper 49, the cover being secured to the outer ends of arms 55 and 56 pivoted at 57 upon the side of the hopper.

Figure 8:
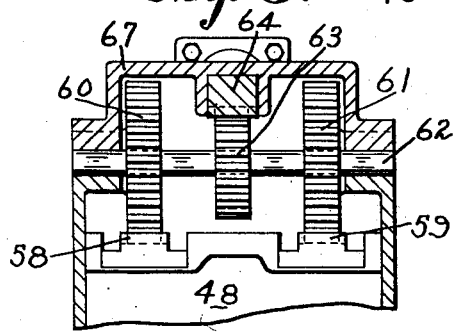
Fig. 8 is a sectional view on line 8—8 of Fig. 2.

As shown in Fig. 8, the charging plunger is provided at its rear face with two series of rack teeth 58 and 59 in mesh with which are gears 60 and 61 secured to a shaft 62 rotatably mounted at the rear of the charging stack. Between these two gears a third gear 63 is mounted on the shaft 62, the teeth of which mesh with the teeth of a rack bar 64 secured to the upper end of a piston-rod 65. The rack bar 64 operates in a suitable guide casing 66, and likewise the gears 61 and 63 are enclosed in a suitable housing 67 secured to the charging stack of the machine.

Upon the piston-rod 65 is suitably mounted a piston-head 68 reciprocable within the cylinder 69. The pipes 70 and 71 leading into the opposite ends of this cylinder communicate with a suitable source of fluid pressure whereby the piston may be operated to actuate the charging plunger. The latter is limited in its downward movement by a stop-pin 72 which operates in a groove 73 in the rear wall of the stack so that when the plunger is at the desired limit of its downward stroke the pin 72 secured therein contacts with the lower edge of the groove and prevents further movement.

Figure 6:
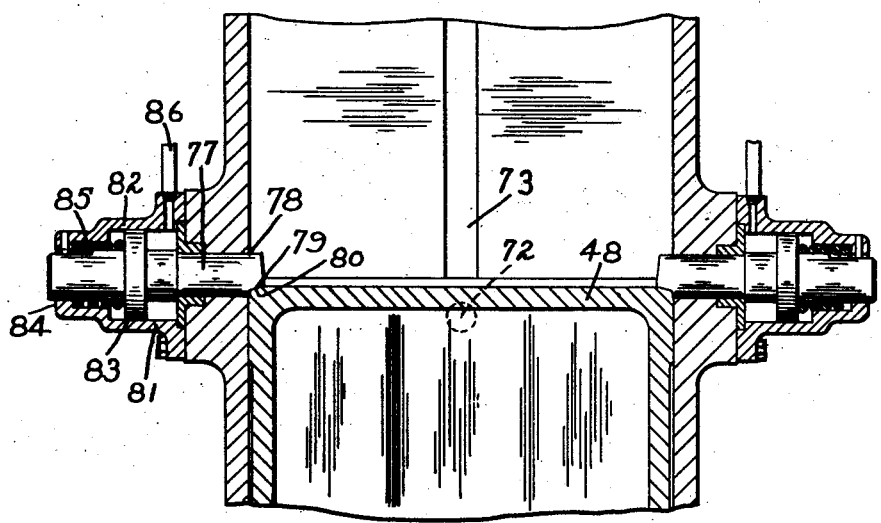
Fig. 6 is an enlarged view showing the locking mechanism for the charging plunger.

In order to firmly lock the plunger in its operative position shown in Fig. 5, wherein the charging opening is closed, I have mounted in the charging stack a pair of reciprocable bolts 75 and 76, in such a position that when the plunger is at the position desired during the operation of the machine these bolts may be projected outwardly, as shown in Fig. 6, so that their ends overlie the top of the plunger and hold it securely against upward movement. Preferably these lock-bolts will be so positioned with reference to the plunger and the stop-pin 72 and groove 73 that they will hold the plunger at the limit of its downward stroke, as determined by the stop-pin and groove, so that during the operation of the machine the plunger will be held in fixed position.

Each of the lock bolts 75 and 76 comprises a bolt-head 77 designed to project through a bore 78, the bolt-head being slightly bevelled at its lower side, as shown at 79, to take over the upper edge of the plunger which may also be slightly bevelled as shown at 80. The body of the bolt is mounted in a casing 81 secured to the stack, the casing providing a cylinder 82 within which operates an annular flange 83 on the bolt. Between this flange and the outer wall 84 of the casing reacts a spring 85 to normally urge the plunger to protracted position in engagement with the upper edge of the plunger.

Leading into the cylinder 82 on the side of the flange opposite the spring 85 is a pipe 86 connected to the source of fluid pressure, so that by this means the bolts may be forced outwardly against the tension of the spring 85 to permit the plunger to be raised by means of the piston and cylinder mechanism 68 and 69.

Figure 7:
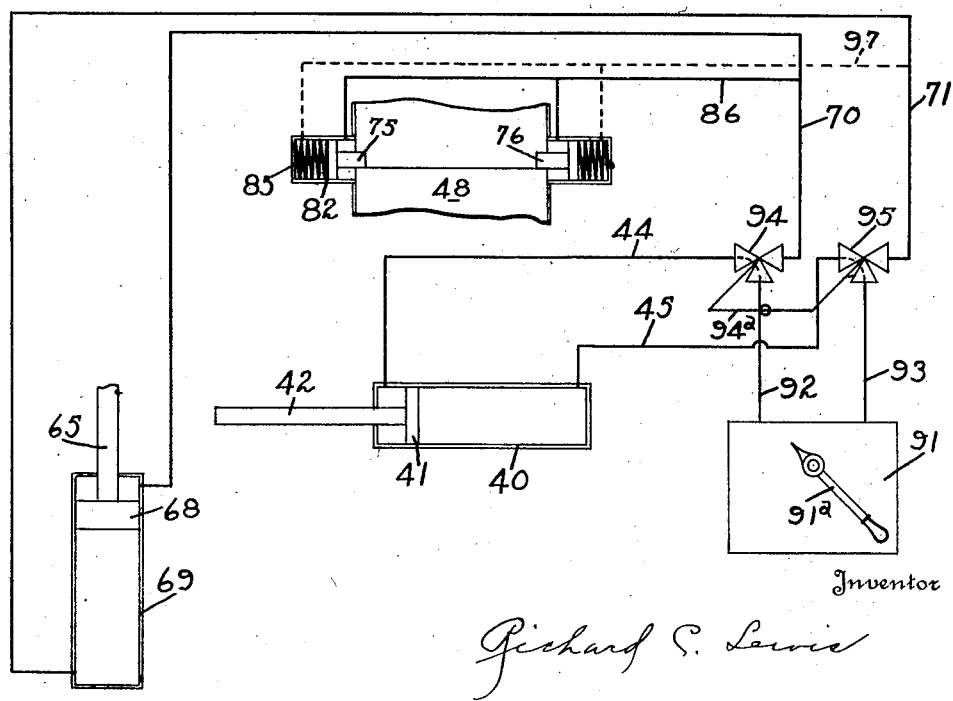
Fig. 7 is a diagrammatic view showing the fluid pressure operated system for operating the various parts of the machine.

The connection of the source of fluid pressure with the various operating parts of the device is shown in the diagrammatic view, Fig. 7.

While in the particular embodiment of the invention shown in the drawings I have contemplated the use of oil as the fluid through which various devices are operated, it will, of course, be apparent that other fluids may be used, if desired, without material changes in the structure or operation of the machine.

Upon the base of the machine is mounted a motor 90, the shaft of which is connected to an oil pump or other pressure source 91, which supplies the fluid pressure to operate various movable parts of the machine. By means of the lever 91ª the direction of the flow of the oil from the pump or other pressure source may be reversed, and also this lever may be moved to a neutral position whereby there will be no outflow of oil from the pump in either direction, and all parts of the fluid pressure actuated system will remain at rest. From the oil pump 91, pipes 92 and 93 lead to three-way valves 94 and 95, from which valves lead the pipes 44 and 45 communicating with the opposite ends of the cylinder 40 secured to the lower discharge door or closure member. Also leading from the valves 94 and 95 are oil pipes 70 and 71 communicating with opposite ends of the cylinder 69 by which the charging plunger is actuated. From the pipe 70 a branch 86 leads to the bolt cylinders 82.

The operation of my device may be briefly described as follows. With the valve control lever 94ª set as shown in Fig. 7, it will be apparent that, as shown by the dotted lines through the diagrammatic illustrations of the valves, the pipes 92 and 93 are in communication with the pipes 44 and 45 leading to the discharge mechanism. The control lever 91ª may now be set to direct a flow of oil outwardly through the pipes 93 and 45 to force the cylinder 40 to the right, as shown in Figs. 4 and 7, and to close the discharge opening. During this operation any oil which remained at the left of the piston 41 is returned to the pump through the pipes 44 and 92. If it is desired to open the chamber, the control lever 91ª is moved to direct the flow of oil in the opposite direction, and the oil now flows outwardly through the pipes 92 and 44, and returns to the pump through the pipes 45 and 93. It will thus be seen that the discharge door may be conveniently controlled independently of the actuation of other parts of the machine.

If it is desired to actuate the charging plunger 48, the valve lever 94ª is moved to the right to connect the pipes 92 and 93 with the pipes 70 and 71. When the plunger is in a raised position, as shown in Figs. 4 and 5, the head 77 of the lock-bolts 75 and 76 are retained in retracted position within their casings by means of their contact with the side walls of the plunger. The plunger is, therefore, free to descend at all times. After the charge has been introduced into the mixing chamber, the control lever 91ª is moved to direct the flow of oil outwardly through the pipes 93 and 71 so as to raise the piston 68, the oil above the piston returning to the pump through the pipes 70 and 92. As the piston is raised, the plunger is lowered by means of the rack bar 64, pinions 60, 61 and 63, and the rack teeth 59 upon the rear wall of the plunger until the stop-pin 72 contacts with the lower edge of the groove 73 to limit further downward movement. At this time the lock-bolts 75 and 76 are protracted by their springs 85, so that the heads of these bolts project over the upper edge of the plunger and lock it in the position shown in Fig. 5, wherein the charging opening is effectually closed.

When it is desired to raise the plunger, the control lever 91ª is moved to a position to effect the flow of oil outwardly through the pipes 92 and 70, the oil flowing through the branch pipe 86 into the lock-bolt casings to cause the retraction of the bolts into the casing to permit the raising of the plunger, the pressure of the oil against the flanges 83 overcoming the tension of the springs 85. The plunger is now raised by the lowering of the piston 68 so that the hopper will be again in communication with the feed chamber, as shown in Fig. 3.

If desired, as shown by the dotted lines in Fig. 7, a branch pipe 97 may lead from the pipe 71 to the lock-bolt cylinder 82 behind the flanges 83 so that the springs 85 may be dispensed with and the lock-bolts actuated in both directions by means of oil pressure.

While I have shown and described some preferred embodiments of my invention, it will be obvious that it is not to be limited to all the details shown, but is capable of modification and variation within the spirit of the invention and within the scope of the appended claims.

I do not claim herein a rubber treating machine comprising a chamber, a charging stack communicating with the chamber, a plunger mounted in said stack for up and down movements therein, a plunger operating member mounted for up and down movements parallel to said plunger, and a connection between said plunger and operating member, or other features claimed in my application filed of even date, Serial No. 14,451.

What I claim is:—

1. A rubber mixing machine comprising a chamber having an opening therein, a sliding closure member for said opening, means for moving said closure member to open and closed positions, and a locking bolt reciprocably mounted adjacent the closure member and adapted to be protracted to engage over the outer end of the same to secure it in closed position, and power actuated means to withdraw the lock-bolt from engaging position.

2. A rubber mixing machine comprising a chamber having an opening therein, a sliding closure member for said opening, means for moving said closure member to open and closed positions, and a locking bolt reciprocably mounted adjacent the closure member and adapted to be protracted to engage over the outer end of the same to secure it in closed position, and fluid pressure actuated means to withdraw said bolt from engaging position.

3. A rubber mixing machine, comprising a chamber having an opening therein, a closure adapted to be moved to position to close said opening, a bolt movably mounted adjacent said closure and adapted to engage the latter to lock it in closed position, and power actuated means to withdraw the bolt from engaging position.

4. A rubber mixing machine, comprising a chamber having an opening therein, a closure adapted to be moved to position to close said opening, a bolt movably mounted adjacent said closure and adapted to engage the latter to lock it in closed position, and fluid pressure actuated means to withdraw the bolt from engaging position.

5. A rubber mixing machine, comprising a chamber having an opening therein, a closure adapted to be moved to position to close said opening, a bolt movably mounted adjacent said closure and adapted to engage the latter to lock it in closed position, and automatically acting means to move said bolt in opposite directions to engaging and disengaging positions.

6. A rubber mixing machine, comprising a chamber having a charging opening, a stack leading into said opening, a charging plunger mounted within the stack, a pair of bolts reciprocably mounted at the sides of the stack and normally urged to a protracted position to engage over the top of the plunger to lock it in closed position, and power actuated means to withdraw the bolts from engaging position.

7. A rubber mixing machine, comprising a chamber having a charging opening, a stack leading into said opening, a charging plunger mounted within the stack, a pair of bolts reciprocably mounted at the sides of the stack and normally urged to a protracted position to engage over the top of the plunger to lock it in closed position, and automatically acting power actuated means to move said bolts to disengaging position.

8. A rubber mixing machine, comprising a chamber having a charging opening, a stack leading into said opening, a charging plunger mounted within the stack, a pair of bolts reciprocably mounted at the sides of the stack and normally urged to a protracted position to engage over the top of the plunger to lock it in closed position, means to actuate said plunger to open position, and means effecting the disengagement of said bolts upon the operation of said actuating means.

9. A rubber treating machine, comprising a mixing chamber, a charging opening at the upper side of the chamber, and a stack leading into said opening, a plunger reciprocably mounted in said stack and adapted to be moved to position to close the opening, a casing mounted upon the side of the stack, a lockbolt reciprocably mounted in said casing, the end of said bolt being adapted to extend within the stack and engage the plunger to lock it in closed position, means within said casing to urge said bolt to engaging position, and power actuated means to urge said bolt to disengaging position.

10. A rubber treating machine, comprising a mixing chamber, a charging opening at the upper side of the chamber, and a stack leading into said opening, a plunger reciprocably mounted in said stack and adapted to be moved to position to close the opening, a casing mounted upon the side of the stack, a lockbolt reciprocably mounted in said casing, the end of said bolt being adapted to extend within the stack and engage the plunger to lock it in closed position, means acting upon said bolt within said casing to urge it to position to engage the plunger and power actuating means acting upon said bolt within the casing to urge it to disengaging position.

11. A rubber treating machine, comprising a mixing chamber, a charging opening at the upper side of the chamber, and a stack leading into said opening, a plunger reciprocably mounted in said stack and adapted to be moved to position to close the opening, a casing mounted upon the side of the stack, a lock-bolt reciprocably mounted in said casing, the end of said bolt being adapted to extend within the stack and engage the plunger to lock it in closed position, and means acting upon said bolt within said casing to urge it in opposite directions to engaging and disengaging positions.

12. A rubber treating machine comprising a mixing chamber, a charging opening at the upper side of the chamber, and a stack leading into said opening, a plunger reciprocably mounted in said stack and adapted to be moved to position to close the opening, a casing mounted upon the side of the stack, a lock-bolt reciprocably mounted in said casing, the end of said bolt being adapted to extend within the stack and engage the plunger to lock it in closed position, a flange upon said bolt within the casing, and means acting upon opposite sides of said flange to urge the bolt in opposite directions.

13. A rubber treating machine, comprising a mixing chamber, a charging opening at the upper side of the chamber and a stack leading into said opening, a plunger reciprocably mounted in said stack and adapted to be moved to position to close the opening, a casing mounted upon the side of the stack, a lock-bolt reciprocably mounted in said casing, the end of said bolt being adapted to extend within the stack and engage the plunger to lock it in closed position, a flange upon said bolt within the casing, a spring upon one side of said flange to urge the bolt to engaging position, and means to admit a fluid under pressure to said casing on the opposite side of the flange to retract the bolt to disengaging position.

14. A rubber mixing machine, comprising a chamber having a charging opening at the upper side thereof and a stack leading into said opening, a plunger slidably mounted within the stack adapted to open and close the said opening, a reciprocable lock-bolt mounted adjacent the plunger and adapted to engage the same to lock it in closed position, means to raise and lower said plunger, and means to effect the disengagement of the lock-bolt therefrom when said raising means is set into operation.

15. A rubber mixing machine, comprising a chamber having a charging opening at the upper side thereof and a stack leading into said opening, a plunger slidably mounted within the stack adapted to open and close the said opening, a reciprocable lock-bolt mounted adjacent the plunger and adapted to engage the same to lock it in closed position, power means to raise and lower said plunger, and means to effect the disengagement of the lock-bolt therefrom when said raising means is set into operation.

16. A rubber mixing machine, comprising a chamber having a charging opening at the upper side thereof and a stack leading into said opening, a plunger slidably mounted within the stack adapted to open and close the said opening, a reciprocable lock-bolt mounted adjacent the plunger and adapted to engage the same to lock it in closed position, fluid pressure operated means to raise and lower the plunger, and means to effect the disengagement of said lock-bolt when said fluid pressure means is set into operation.

17. A rubber mixing machine, comprising a charging opening at the upper side thereof, a charging stack opening into said opening, a plunger reciprocably mounted in said stack, a lock bolt movably mounted adjacent the plunger, and adapted to engage the latter to lock it in closed position, fluid pressure means to move the lock-bolt to disengaging position, fluid pressure operated means to raise said plunger, and means to simultaneously admit a fluid under pressure to both said means to withdraw the bolt from engaging position and permit the plunger to be raised.

In witness whereof, I have hereunto set my hand on the 7th day of March, 1925.

RICHARD C. LEWIS.